US008639063B2

(12) United States Patent
Tamai et al.

(10) Patent No.: US 8,639,063 B2
(45) Date of Patent: Jan. 28, 2014

(54) INFORMATION PROCESSING SYSTEM AND INFORMATION PROCESSING METHOD, AND INFORMATION PROCESSING PROGRAM USED THEREIN

(76) Inventors: Yoshiyuki Tamai, Itami (JP); Masami Yamada, Sennan-gun (JP); Yoshiki Tokimoto, Nishiwaki (JP); Kimie Mishima, Itami (JP)

( * ) Notice: Subject to any disclaimer, the term of this patent is extended or adjusted under 35 U.S.C. 154(b) by 0 days.

(21) Appl. No.: 12/691,087

(22) Filed: Jan. 21, 2010

(65) Prior Publication Data

US 2010/0149602 A1    Jun. 17, 2010

Related U.S. Application Data

(62) Division of application No. 10/998,805, filed on Nov. 30, 2004, now Pat. No. 7,676,116.

(30) Foreign Application Priority Data

May 6, 2004    (JP) ................................. 2004-137310

(51) Int. Cl.
*G06K 9/60*    (2006.01)

(52) U.S. Cl.
USPC ........................... 382/305; 358/524; 358/403

(58) Field of Classification Search
USPC .................... 382/305; 358/403, 524
See application file for complete search history.

(56) References Cited

U.S. PATENT DOCUMENTS

| 5,764,866 A | * | 6/1998 | Maniwa | 358/1.15 |
|---|---|---|---|---|
| 5,999,708 A | * | 12/1999 | Kajita | 358/1.15 |
| 6,098,067 A | * | 8/2000 | Erickson | 1/1 |
| 6,115,739 A | * | 9/2000 | Ogawa et al. | 709/215 |
| 6,335,966 B1 | | 1/2002 | Toyoda | |
| 6,633,913 B1 | | 10/2003 | Chalstrom et al. | |
| 6,778,289 B1 | * | 8/2004 | Iwata | 358/1.15 |
| 7,099,869 B1 | | 8/2006 | Forstall et al. | |
| 7,215,434 B1 | * | 5/2007 | Janse et al. | 358/1.15 |
| 7,532,343 B2 | * | 5/2009 | Mifune | 358/1.15 |
| 7,545,527 B2 | * | 6/2009 | Matsuhara et al. | 358/1.15 |
| 7,676,116 B2 | * | 3/2010 | Tamai et al. | 382/305 |
| 7,884,954 B2 | * | 2/2011 | Endoh | 358/1.15 |
| 8,422,039 B2 | * | 4/2013 | Kimura | 358/1.13 |
| 2002/0033967 A1 | * | 3/2002 | Liu | 358/402 |

(Continued)

FOREIGN PATENT DOCUMENTS

| JP | 06-04642 | | 1/1994 | |
|---|---|---|---|---|
| JP | 2001-028655 | | 1/2001 | |
| JP | 2004152088 A | * | 5/2004 | G06F 17/21 |

*Primary Examiner* — Jayesh A Patel
(74) *Attorney, Agent, or Firm* — Buchanan Ingersoll & Rooney PC (57) ABSTRACT

An information processing system stores image files formed by an image forming apparatus in a desired storage position in an information processing terminal through simple operations. The information processing terminal, in accordance with an instruction to incorporate an image file, sends to the image forming apparatus information that includes at least identification information by which to identify a storage destination for the image file, a file name for the data file corresponding to a selected icon and storage position information that indicates the storage position in a folder of a directory in the storage destination in which the data file is to be stored. The image forming apparatus registers the information, and causes a selection key for the registered information to be displayed. A new selection key is created for information to be displayed when new settings information is registered based on the information sent from the information processing terminal.

16 Claims, 8 Drawing Sheets

(56) References Cited

U.S. PATENT DOCUMENTS

| | | |
|---|---|---|
| 2002/0054379 A1 | 5/2002 | Yamaguchi |
| 2002/0069212 A1* | 6/2002 | Leonardos .................... 707/200 |
| 2003/0072031 A1* | 4/2003 | Kuwata et al. ............... 358/1.15 |
| 2003/0090717 A1* | 5/2003 | Yoshida et al. .............. 358/1.15 |
| 2004/0190045 A1* | 9/2004 | Matsuhara et al. .......... 358/1.15 |
| 2005/0198072 A1* | 9/2005 | Iinuma et al. ............... 707/104.1 |

* cited by examiner

INFORMATION PROCESSING SYSTEM AND INFORMATION PROCESSING METHOD, AND INFORMATION PROCESSING PROGRAM USED THEREIN

This application is a divisional of U.S. patent application Ser. No. 10/998,805, filed on Nov. 30, 2004, which claims priority to Japanese Application No. 2004-137310 filed in Japan on May 6, 2004, the entire contents of which are hereby incorporated by reference.

BACKGROUND OF THE INVENTION

1. Field of the Invention

The present invention relates to an information processing system, and more particularly, to an information processing system that includes an information processing terminal such as a PC and an image forming apparatus such as a scanner that are capable of sending and receiving data, as well as to an information processing method and information processing program used therein.

2. Description of the Related Art

For image forming apparatuses such as scanners, copying machines and MFPs that are used in offices and the like, network-based apparatuses that are connected to a network and can carry out transmission and receipt of data to and from information processing terminals that are also connected to the network have been increasingly becoming the mainstream in recent years. In a network that includes such an image forming apparatus, image data files formed by the image forming apparatus (hereinafter simply 'image files') can be sent to an information processing terminal on the network and stored in the information processing terminal. These days a network is generally connected to other networks over communication cables or the Internet, for example, such that data can be mutually sent and received therebetween. Accordingly, an image file formed by an image forming apparatus on one network can be sent to a terminal connected to another network, and the image file can be stored thereon.

Technologies for an information processing terminal to receive and store image files formed by an image forming apparatus, where both apparatuses are connected to a network, are disclosed in Japanese Laid-Open Patent Applications H6-4642 and 2001-28655, for example.

Incidentally, in the conventional art, in order to store an image file formed by a network-connected image forming apparatus in a desired storage position (i.e., a directory) on a desired information processing terminal under a desired file name, it is necessary to enter the name of the information processing terminal or the recipient in the image forming apparatus and carry out operations such as moving the data and changing the file name on the side of the information processing terminal, which comprises the recipient, after transmission of the image file from the image forming apparatus thereto is completed. This requires operations such as the entering of parameter values to be performed on both the image forming apparatus and the information processing terminal, which is cumbersome.

OBJECT AND SUMMARY

An object of the present invention is to provide an improved information processing system and the like that resolve the problems identified above.

Another object of the present invention is to provide an information processing system and the like that can store image files formed by an image forming apparatus in a desired storage position in a desired information processing terminal through simple operations.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Embodiments of the present invention are described below with reference to the accompanying drawings. In the description below, an example is shown in which a multifunction peripheral (MFP) that has a printer function, facsimile function, copier function and scanner function is used as the image forming apparatus.

Figure 1:
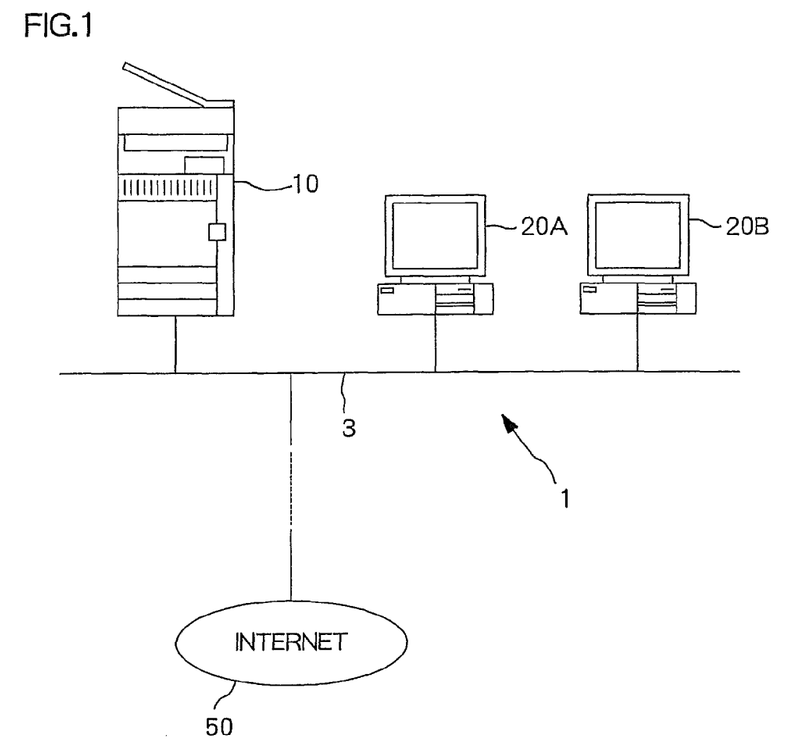
FIG. 1 shows the construction of a network that includes information processing terminals and an MFP pertaining to an embodiment of the present invention.

FIG. 1 is a schematic representation of a network that includes an MFP and information processing terminals pertaining to an embodiment of the present invention. This network 1 comprises various apparatuses including an MFP 10 and multiple information processing terminals 20A and 20B such as personal computers. Each apparatus is connected to the others via a network bus 3 such that they can send and receive data to and from each other. In this network 1, an image file can be obtained by the MFP 10 when an original document is read by its scanning unit 16 (see FIG. 2), and the image file can be sent to the information processing terminal 20A or 20B, where it is displayed or stored, for example. The terminal 20A or 20B can also process information data (including image files) and send it to the MFP 10 for printing or the like. This network 1 may also be connected to the Internet 50 via the network bus 3. In this case, the MFP 10 can send an image file formed by the scanning unit 16 to a remote information processing terminal connected to a different network via the Internet 50, for example, and can receive information data from such information processing terminal via the Internet 50 and print it out.

The structure comprising the MFP 10 and the information processing terminals 20A and 20B or remote information processing terminals that can send and receive data therebetween in this fashion is referred to as an 'information processing system' below. This is equivalent to the 'information processing system' in the Claims pertaining to the present invention.

In actuality, such apparatuses as a proxy server, a mail server, a router, etc. that are not shown in FIG. 1 are also included in the network 1, but they are omitted from the drawing.

Figure 2:
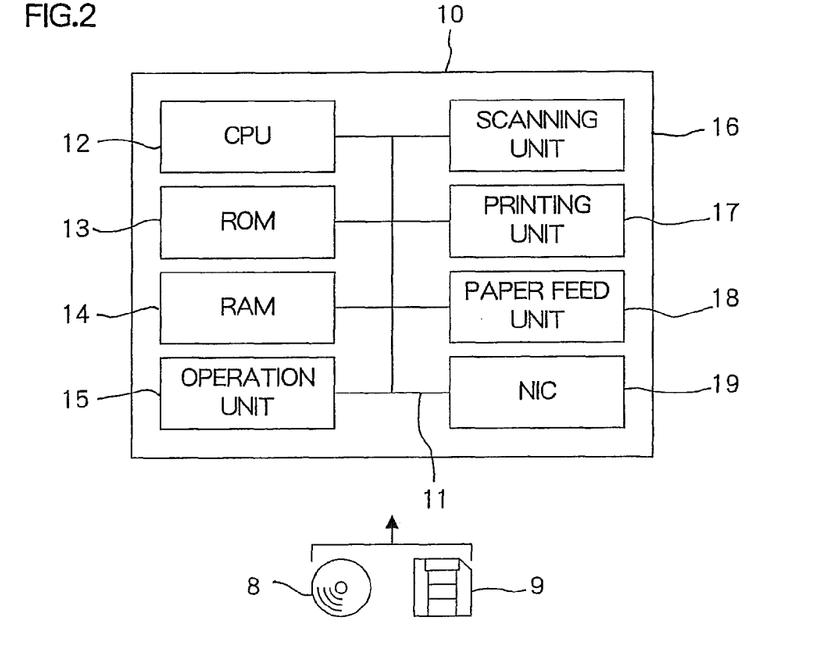
FIG. 2 shows the basic construction of the MFP.

FIG. 2 is a block diagram showing the basic construction of the MFP 10 that is connected to the network 1 and comprises a part of the information processing system. The MFP 10 has a CPU 12 that performs sequence control for each component of the MFP 10 by essentially causing various commands to be executed based on prescribed programs, a ROM 13 that stores programs based on which the sequence control is carried out by the CPU 12, a RAM 14 that temporarily stores print job data sent from the work area necessary for the execution of the programs or from an external device, as well as various settings information entered by the user to be used in connection with such operations as the one-touch registration function or job memory function, an operation unit 15 that enables input of various settings information and operation of the apparatus by the user, a scanning unit 16 that reads original documents and obtains image files, a printing unit 17 that executes printing onto paper based on print job data, a paper feed unit 18 that feeds paper to the printing unit 17, and a network interface card ('NIC' in the drawing) 19 for transmission and receipt of various data files including image files to and from external devices. These components are interconnected via a bus 11 such that they can transmit and receive data to and from each other.

In this embodiment, the programs based on which sequence control is carried out by the CPU 12 are stored in the ROM 13 of the MFP 10, for example, but such programs may be stored on an external recording medium such as a CD-ROM 8 or a floppy disk® 9, and loaded wherever needed therefrom via a CD-ROM drive or floppy disk drive (not shown) that are externally mounted to the MFP 10.

The information processing terminal 20A that is connected to the network 1, like the MFP 10, and comprises a part of the information processing system, will now be described. Of the information processing terminals 20A and 20B, the information processing terminal 20A is described here. Because the information processing terminal 20B has a construction identical to that of the information processing terminal 20A, it will not be described here.

Figure 3:
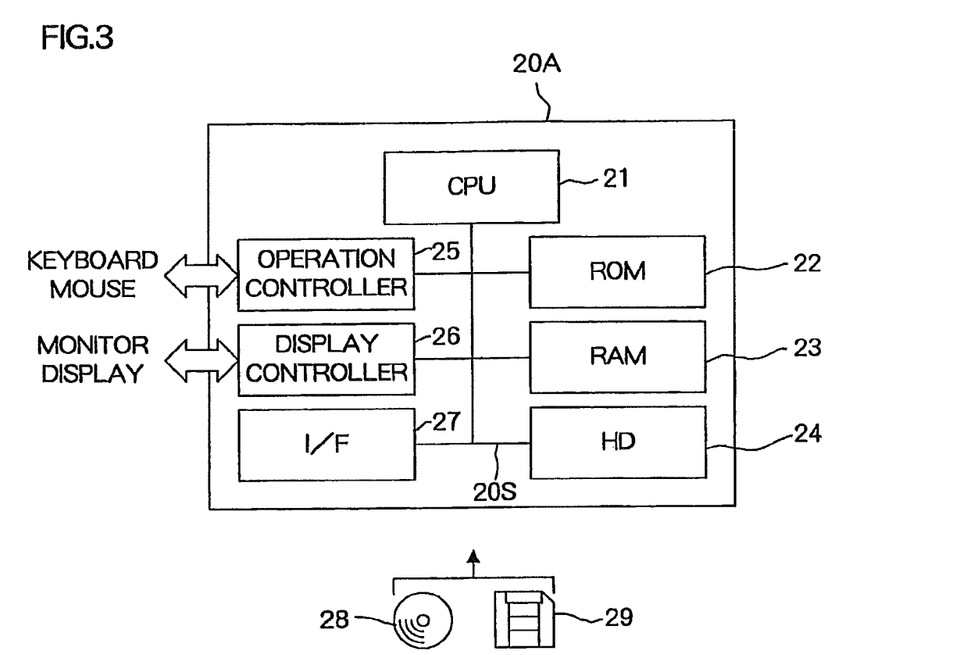
FIG. 3 shows the basic construction of the information processing terminals.

FIG. 3 is a block diagram showing the basic construction of the information processing terminal 20A. This information processing terminal 20A has a CPU 21 that performs sequence control for each component of the terminal 20A based on programs such as the operating system (OS), which is the basic software program, a ROM 22 that stores the boot program that is executed when the terminal 20A is booted up, a RAM 23 that is used as a buffer area for the work area necessary for the execution of a program, a hard disk ('HD' in the drawing) 24 that stores the OS, application programs and various types of data, an operation controller 25 that detects the input operations executed by the user via the input devices such as a keyboard and mouse and performs control in response thereto, a display controller 26 that controls the display of various types of information on the monitor display, and an interface ('I/F' in the drawing) 27 for the transmission and receipt of various types of data to and from the MFP 10 and the other information processing terminal 20B. These components are interconnected via a bus 20S such that they can transmit and receive data to and from each other.

In this information processing terminal 20A, various data files (text files, image files and the like) each including a file name are respectively stored in prescribed storage positions (directories), and GUI file icons corresponding to the data files are displayed on the monitor display.

The OS and application programs based on which sequence control is performed by the CPU 21 are stored on the hard disk 24 in this embodiment, but these programs may be stored on an external recording medium such as a CD-ROM 28 or a floppy disk 29, and loaded therefrom when needed.

In the information processing system comprising the MFP 10 and the information processing terminals 20A and 20B having the constructions described above, an image file formed by the scanning unit 16 of the MFP 10 can be sent to and stored on the information processing terminal 20A or 20B. In this case, as described above, according to the conventional art, the information processing terminal 20A or 20B, which is the recipient of the image file, is entered on the side of the MFP 10, and when the data transmission to the information processing terminal 20A or 20B from the MFP 10 has been completed, the data file must be moved and the file name changed on the side of the information processing terminal 20A or 20B, but in this embodiment, a desired storage position in a desired information processing terminal can be registered with the MFP 10 as the recipient for the image file formed by the MFP 10 through a relatively simple operation performed on the side of the information processing terminal 20A or 20B, and by entering the registered storage position on the side of the MFP 10 at the time of image file formation, the image file can be stored in the desired storage position on the desired information processing terminal.

Embodiments 1 and 2 that realize storage of an image file on the information processing terminal 20A or 20B via various operations are described below. In this description, as was the case with the description using FIG. 3, of the information processing terminals 20A and 20B, the terminal 20A is used as an example. Because the operations of the information processing terminal 20B are identical as those of the terminal 20A, they will not be explained in a repeated fashion.

Embodiment 1

Figure 4:
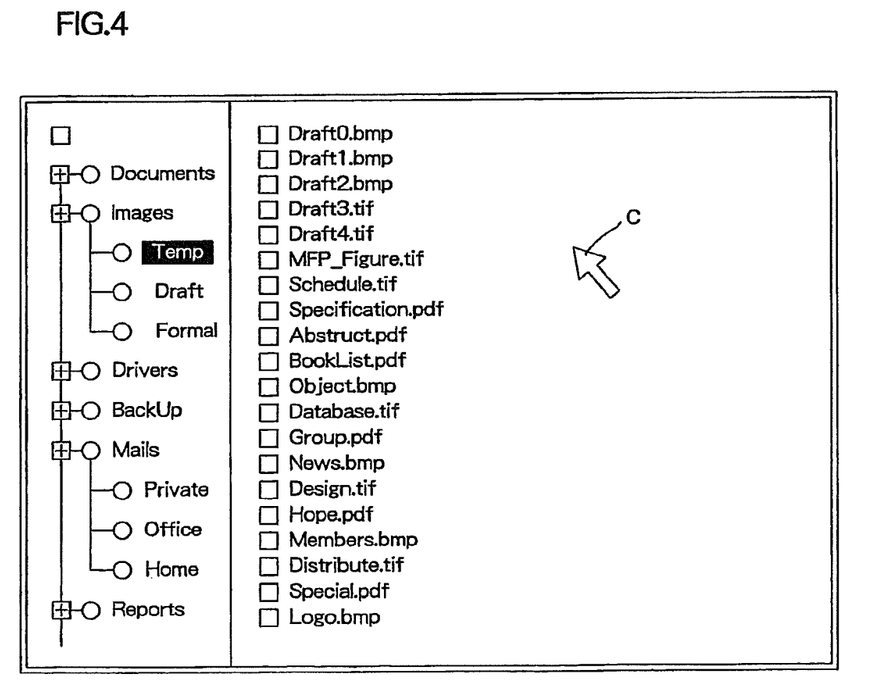
FIG. 4 shows a first procedure of an operation pertaining to an Embodiment 1 to set the storage destination for data obtained by the MFP from an information processing terminal.

For the Embodiment 1, an example in which an image file obtained by the MFP 10 is overwritten based on an existing file icon in the information processing terminal 20A will be described. FIG. 4 shows one example of file icons displayed on the information processing terminal 20A. This information processing terminal 20A uses the conventional file management method in which directories (folders) in which files are stored are structured hierarchically (nested box style).

First, a directory in which the original file that is to be overwritten by the image file formed by the MFP 10 is selected on the side of the information processing terminal 20A. In the situation shown in FIG. 4, the directory 'Temp' that is a lower-ranking directory under the directory 'Images' is selected, and the file icons that correspond to the files contained in the directory 'Temp' are being displayed.

Figure 5:
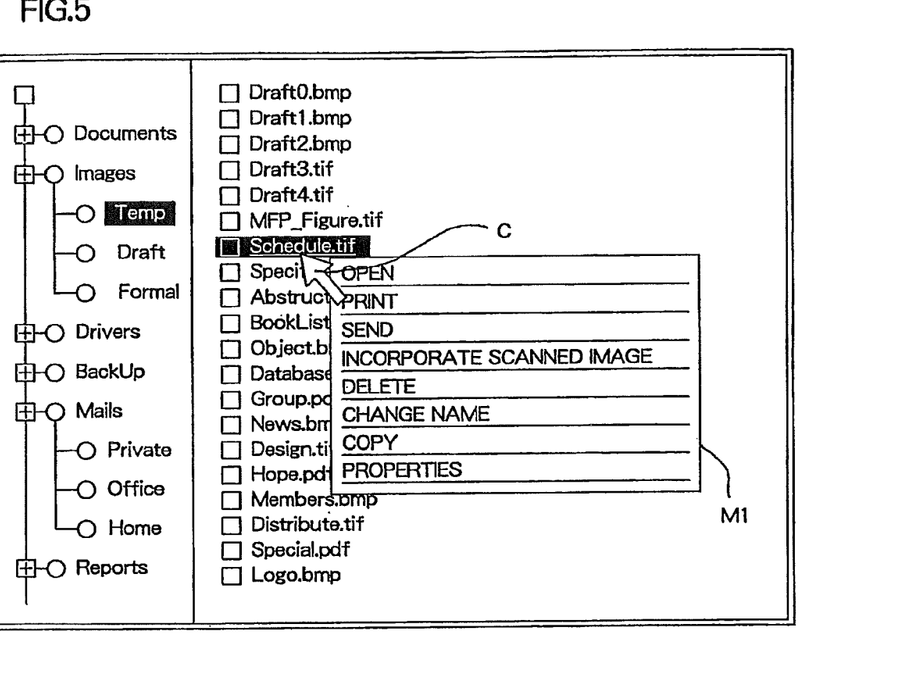
FIG. 5 shows a second procedure of the operation pertaining to the Embodiment 1.

In the state shown in FIG. 4, when the cursor C is positioned on the file icon named 'Schedule.tif' and the mouse is right-clicked, an operation menu M1 that includes various menu items are displayed (see FIG. 5). The operation menu M1 includes the menu items 'Open', 'Print', 'Send', 'Incorporate scanned image', 'Delete', 'Change name', 'Copy' and 'Properties'. As an operation to incorporate the image file formed by the MFP 10, the menu item 'Incorporate scanned image' is selected from among the items in the operation menu M1 (see FIG. 6). By performing these operations, based on the information 'Schedule.tif' assigned to the file icon on which the cursor C was positioned, the name of the image file to incorporate, i.e., 'Schedule', and the extension 'tif' that indicates the image file format, are obtained. In addition to such information data that indicates the file name and extension, information data that indicates the identifier by which to identify the information processing terminal 20A and the storage position (the directory 'Temp' below the directory 'Images' in this example) is sent to the MFP 10 from the information processing terminal 20A.

Incidentally, the MFP 10 has a function by which frequently used information, for example, is registered in advance, and such information is read out and set at the time of use (the so-called one-touch registration function). Using this function, the user can read pre-registered information by simply inputting a prescribed number when making a fax or e-mail transmission, such that he does not need to enter the entire recipient information such as the fax number or e-mail address each time he wants to make a transmission, thereby simplifying the recipient setting operation. The RAM 14 of the MFP 10 usually has multiple storage areas that can respectively store individual settings information (hereinafter 'one-touch areas') such that multiple items of settings information can be registered. When the user is to select a one-touch area, the available one-touch areas are shown on the touch-panel style display panel 151 (see FIG. 7) of the operation unit 15 of the MFP 10 as user-interface enabled keys (one-touch keys).

Figure 6:
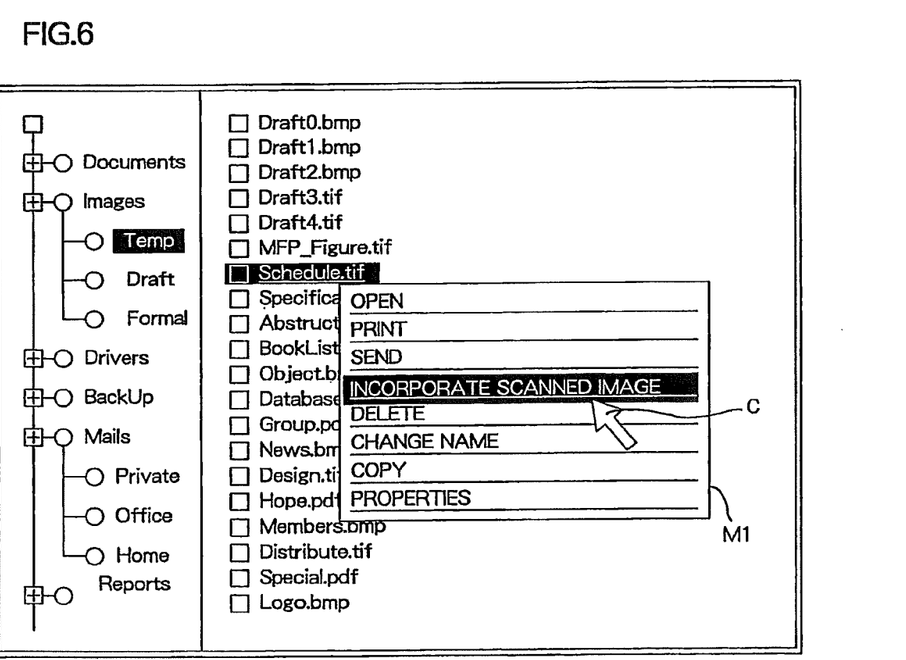
FIG. 6 shows a third procedure of the operation pertaining to the Embodiment 1.

When the information data showing the file name, the extension, the identifier of the information processing terminal and the storage position is received by the MFP 10 following the operations shown in FIGS. 4-6 on the side of the information processing terminal 20A, a new one-touch area is established for such information data, where appropriate, and a new one-touch key that corresponds to that one-touch area is created on the display panel 151 of the operation unit 15.

Figure 7:
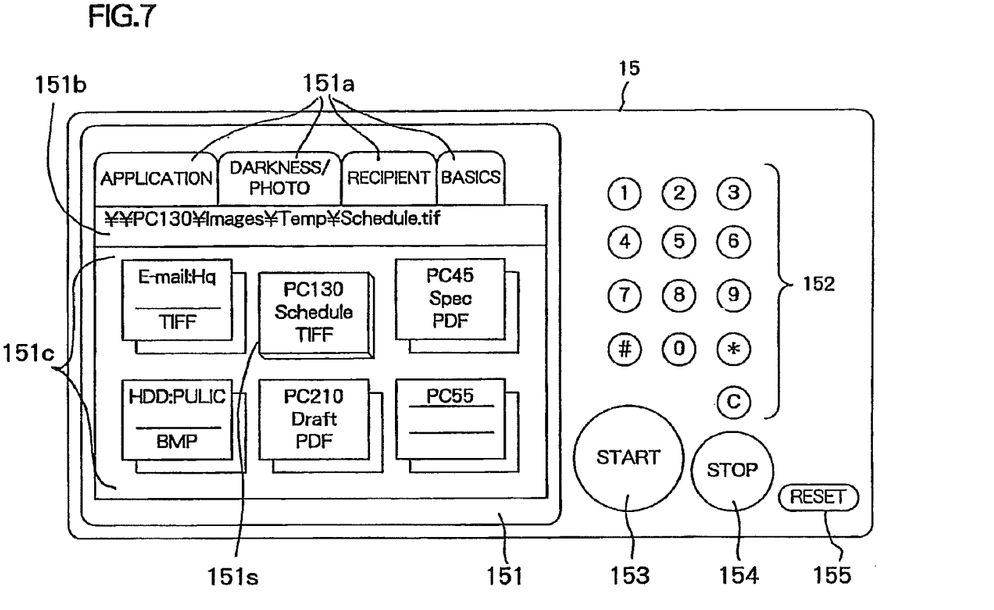
FIG. 7 shows a display unit including one-touch keys created from the MFP.

FIG. 7 shows the operation unit 15 of the MFP 10. This operation unit 15 has a touch panel-style display panel 151 that displays screens containing various types of information, input buttons 152 including a numeric keypad by which to enter the number of copies to make, input the password and the like, as well as a clear button by which to change the setting of the number of copies, a start button 153 by which to start the various functions, a stop button 154 by which to stop the various functions, and a panel reset button 155 by which to return the screen of the display panel 151 to the basic screen and return the parameter values to the default settings.

The operation unit 15 of the MFP 10 actually has other components as well, such as a function switch button by which to select the printing, copying or fax function, for example, and utility buttons by which to show the counter and other special operations, but these additional components are omitted in this description. In addition, although the input button 152, start button 153, stop button 154 and the like are mechanical buttons in this embodiment, the present invention is not limited to this implementation, and these buttons may comprise keys displayed on a screen on the display panel 151.

In the state shown in FIG. 7, a screen by which to set the parameters for the processing of the image file obtained by the scanning unit 16 of the MFP 10 is displayed on the display panel 151. This screen has multiple tags 151a, i.e., 'Application', 'Darkness/photo', 'Recipient (storage destination)', and 'Basics'. In this example, 'Recipient' is selected from among these tags 151a, and when it is selected, a total of six (2×3) one-touch keys 151c that respectively correspond to the one-touch areas established in the MFP 10 are displayed.

In FIG. 7, as described above, a new one-touch key 151s, which was created on the display panel 151 of the operation unit 15 and corresponds to the new one-touch area established for information data sent from the information processing terminal 20A or 20B based on the operations on the side of the information processing terminal 20A or 20B shown in FIGS. 4-6, is displayed as one of these one-touch keys 151c. The one-touch keys 151c including the one-touch key 151s each include information that indicates the image file storage destination (the terminal name or e-mail address), the file name set for the image file and the extension for the image file. For example, 'E-mail:Hq' indicating the image file storage destination and 'TIFF' indicating the extension are assigned to the one-touch key 151c at top left. 'PC 130' indicating the image file storage destination, 'Schedule' indicating the file name set for the image file and 'TIFF' indicating the extension are assigned to the one-touch key 151c (i.e., 151s) at top center.

By selecting one of these one-touch keys 151c, the storage destination, the file name, the extension or the like for the image file obtained by the MFP 10 is determined. When a one-touch key 151c is selected, the recipient, i.e., the information indicating the file storage position on the information processing terminal 20A, is displayed in the information display area 151b of the display panel 151 in response to the selected one-touch key 151c. In the state shown in FIG. 7, the top center one-touch key 151c (151s) is selected, and '¥¥PC130¥Images¥Temp¥Schedule.tif' is displayed in the information display area 151b.

The image file formed through the scanning of an original document by the scanning unit 16 of the MFP 10 with the above settings present on the display panel 151 of the operation unit 15 is sent to the information processing terminal 20A connected to the network 1 via the NIC 19 after the information indicating the file name, the extension, the information processing terminal 20A identifier and the storage position based on such settings is added thereto.

During formation of the image file via scanning, the format therefor is determined from the extension based on the above settings. For example, if the extension setting is 'bmp', a bitmap image file is formed. If the extension is changed to 'tif' when a different image file storage destination is entered, a TIFF image file is formed based on such extension.

When the information processing terminal 20A receives the image file from the MFP 10, it detects the information regarding the file name, the extension and the storage position added to the image file, and stores the image file in accordance with such information. In this case, the data file corresponding to the file icon 'Schedule.tif' specifically shown in FIG. 5 is overwritten with the new image file.

Embodiment 2

Figure 8:
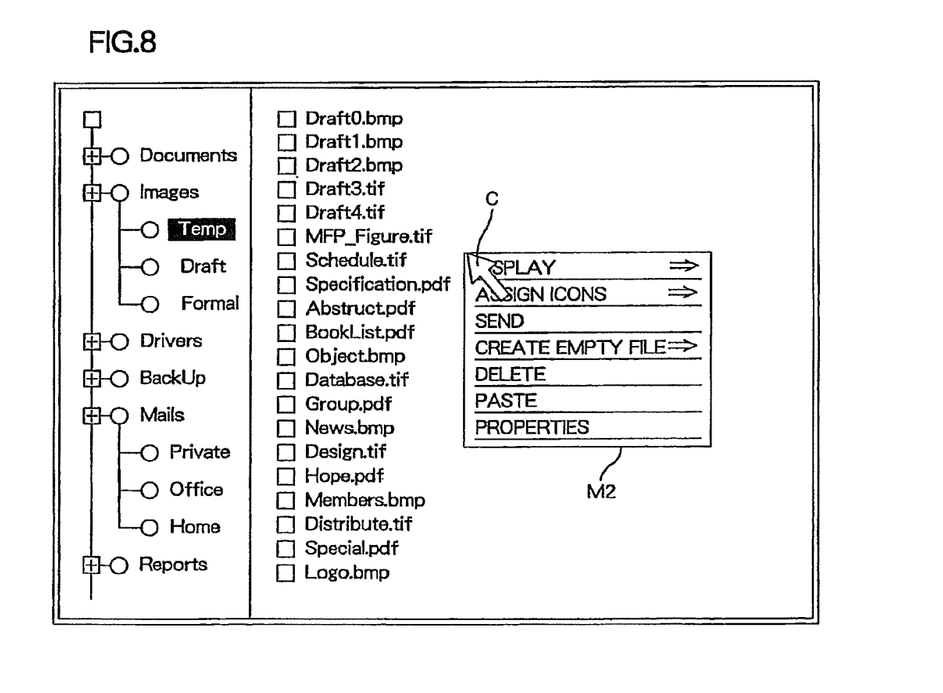
FIG. 8 shows a first procedure of an operation pertaining to an Embodiment 2 to set the storage destination for data obtained by the MFP from an information processing terminal.

An example in which an image file formed by the MFP 10 is stored in the information processing terminal 20A after creating a new file icon will now be described as an Embodiment 2. First, a directory is selected on the side of the information processing terminal 20A as the storage destination for the image data obtained by the MFP 10. In the state shown in FIG. 8, the directory 'Temp' under the directory 'Images' is selected, and the file icons for the files contained in the directory 'Temp' are displayed, as in FIG. 4. In this state shown in FIG. 8, when the mouse is right-clicked with the cursor C placed at a position other than on a file icon, an operation menu M2 that includes various menu items is displayed. In this Embodiment 2, the operation menu M2 includes the menu items 'Display', 'Align icons', 'Send', 'Create empty file', 'Delete', 'Paste' and 'Properties'.

Figure 9:
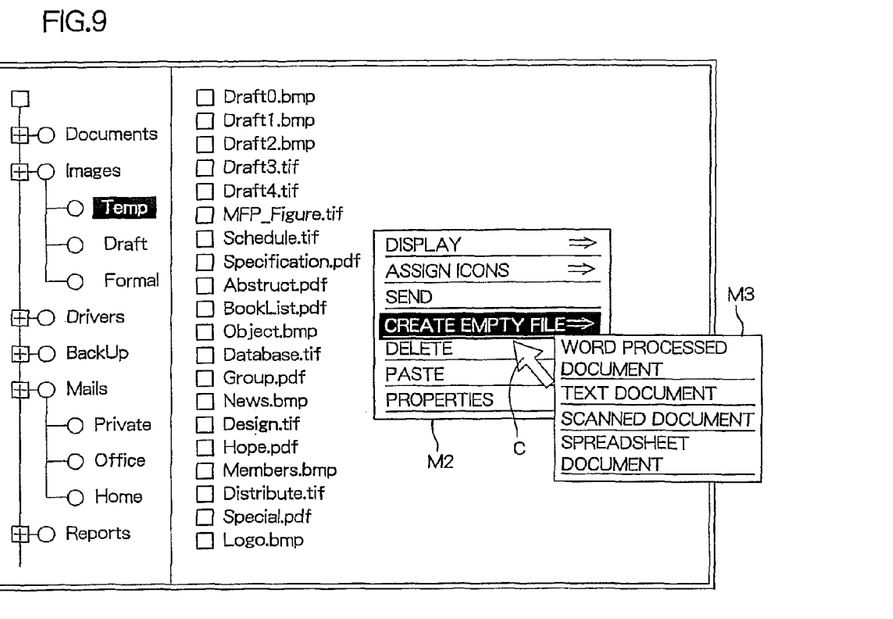
FIG. 9 shows a second procedure of the operation pertaining to the Embodiment 2.
Figure 10:
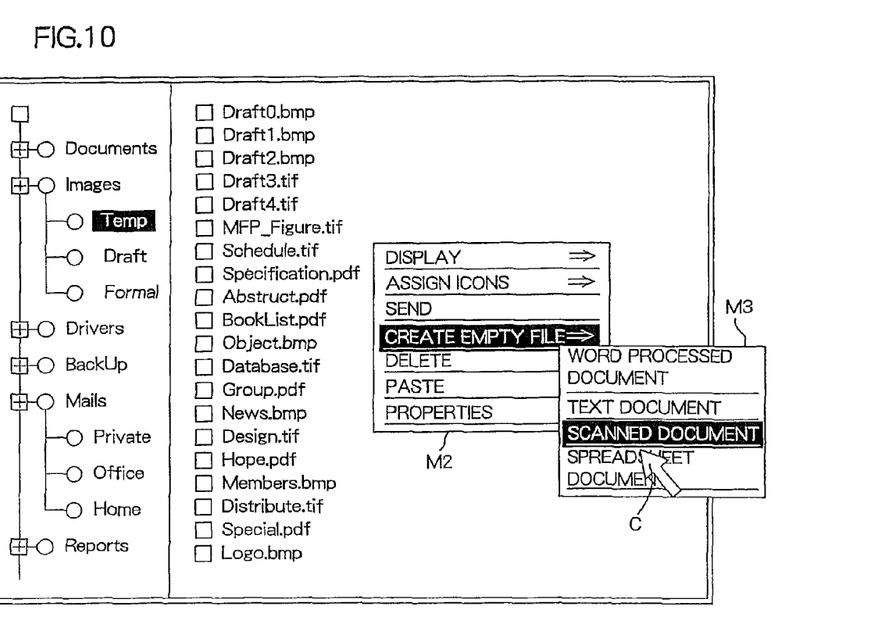
FIG. 10 shows a third procedure of the operation pertaining to the Embodiment 2.

When 'Create empty file' is selected from among the operation menu M2 items as a part of the operation to newly incorporate the image file formed by the MFP 10, a type menu M3 by which to specify the type of the document to be incorporated from the external device is displayed (see FIG. 9). This type menu M3 includes as the types of documents that can be incorporated 'Word processor document', 'Text document', 'Scanned document', and 'Spreadsheet document'.

Figure 11:
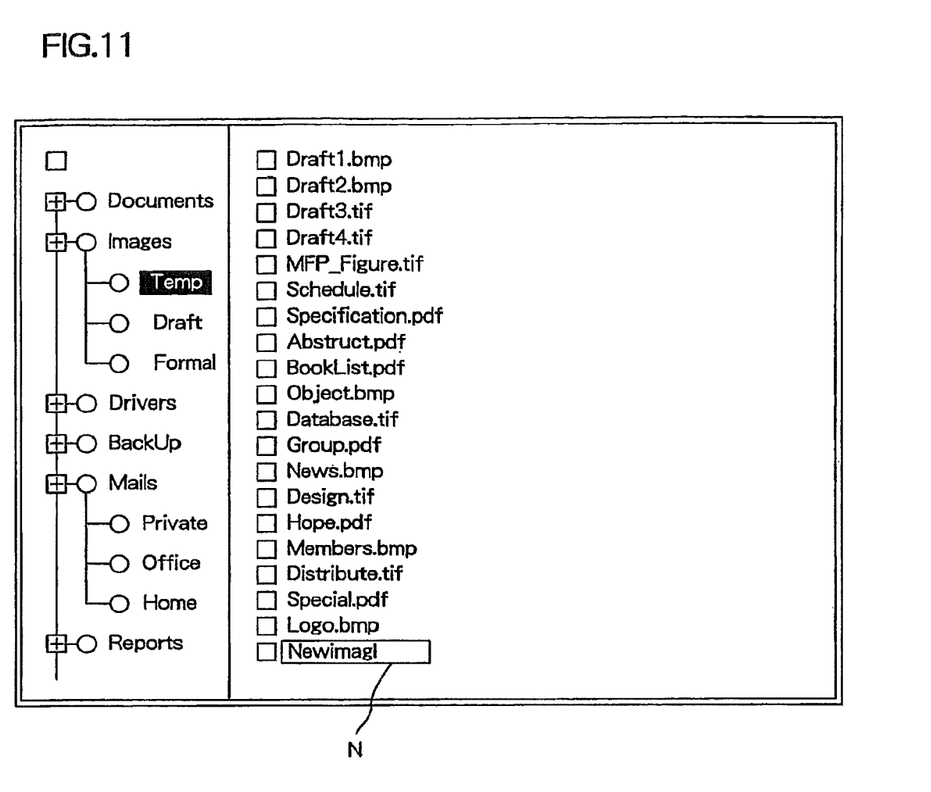
FIG. 11 shows a fourth procedure of the operation pertaining to the Embodiment 2.

When 'Scanned document' is selected from the type menu M3, an empty file is created as a file to be contained in the directory 'Temp', and a file icon for that file is displayed. In the default state, the box N in which the file name and extension are entered for the file icon is blank. The user can enter the file name and extension in this box N (see FIG. 11). FIG. 11 shows the state in which the file name plus extension 'NewImage.tif' is being entered. Upon the completion of file name and extension entry, the information data indicating the file name, the extension, the information processing terminal 20A identifier and the storage position is sent from the information processing terminal 20A to the MFP 10.

In the Embodiment 2, as in the case of the Embodiment 1, when the information data indicating the file name, the extension, the information processing terminal 20A identifier and the storage position is sent from the information processing terminal 20A to the MFP 10 after the operations shown in FIGS. 8-11 are carried out on the side of the information processing terminal 20A, a new one-touch area is established for such information data, where appropriate, and a new one-touch key for that one-touch area is created on the display panel 151 of the operation unit 15.

The image file obtained through the scanning of an original document by the scanning unit 16 of the MFP 10 after selection of the one-touch key newly created on the display panel 15 of the operation unit 15 is sent to the information processing terminal 20A connected to the network 1 via the NIC 19 after the information regarding the file name, the extension, the information processing terminal 20A identifier and the storage position is added thereto based on the above settings.

When the image file is received by the information processing terminal 20A from the MFP 10, the information data regarding the file name, the extension, the information processing terminal 20A identifier and the storage position added to the image file is detected by the image processing terminal 20A, and the image file is stored in accordance with such information data. In this case, the image file is newly stored in the empty data file corresponding to the file icon 'NewImage.tif' specifically indicated in FIG. 11.

It is also acceptable if the file icon displayed on the monitor display of the information processing terminal 20A is displayed differently from regular file icons in order to clearly show its current state after a prescribed file icon is selected on the side of the information processing terminal 20A and incorporation of the image file formed by the MFP 10 is instructed and until such image file is stored as the data file corresponding to the file icon selected.

If, when the image file formed by the MFP 10 is stored at a storage position on the information processing terminal 20A specified based on the information data added to the image file, a file having the same file name already exists at that storage position, the existing file may be overwritten with the image file, or alternatively, the image file may be stored as a different file from the existing file after a serial number (−1, −2, ... or 1, 2, ..., for example) is added to the end of the file name.

Figure 12:
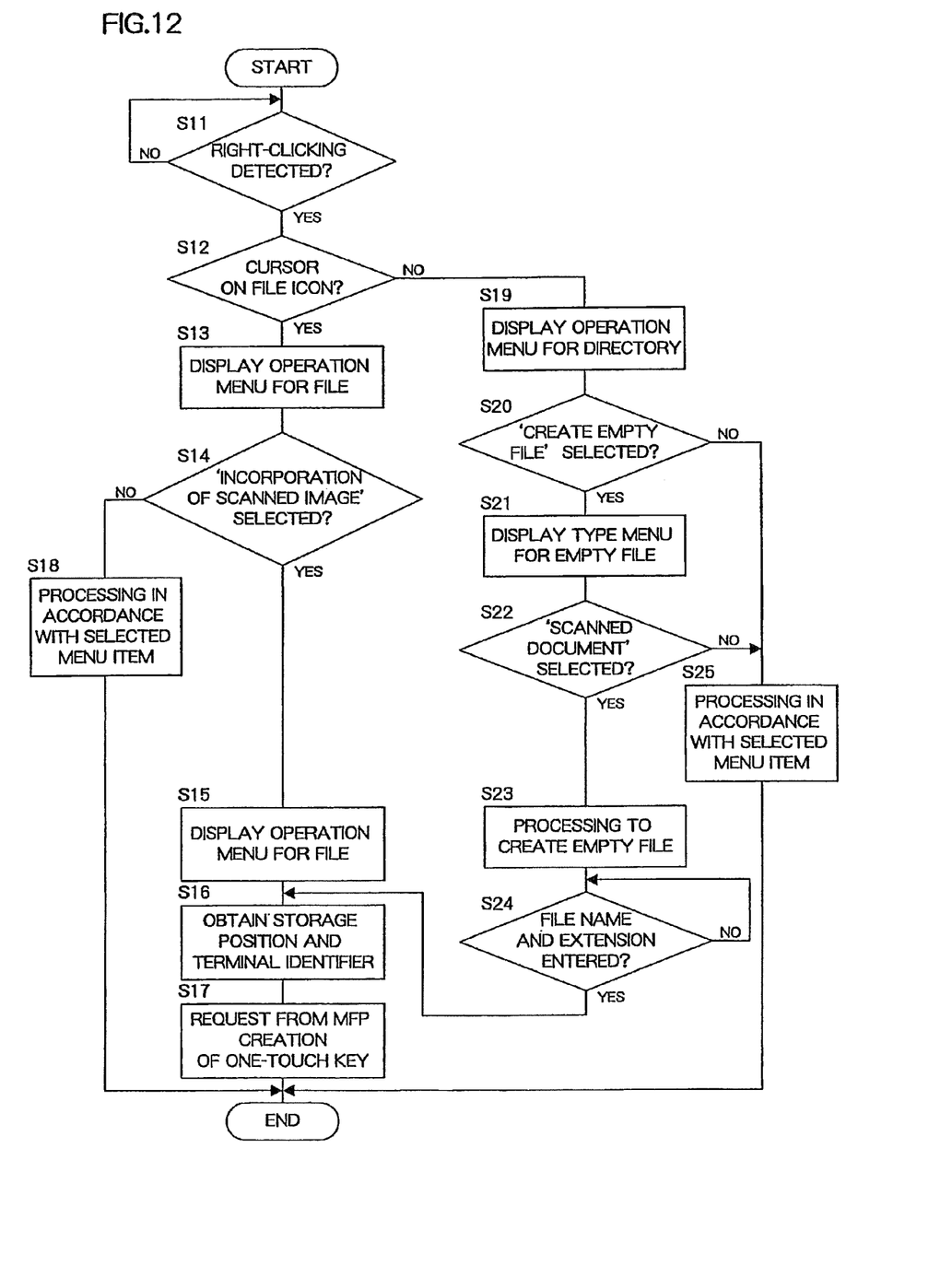
FIG. 12 is a flow chart of the process performed by the information processing terminal for the Embodiments 1 and 2 to request creation of an one-touch key by which to set the storage destination for an image file obtained by the MFP.

FIG. 12 is a flow chart showing the sequence of operations performed on the side of the information processing terminal 20A pertaining to the Embodiment 1 and the Embodiment 2, whereby a one-touch key used for the designation of a storage destination for the image file formed by the MFP 10 is created. In this process, it is first determined whether or not the mouse has been right-clicked (S11). If it is determined that right-clicking was not carried out, the operation of S11 is repeated, and if it is determined that right-clicking was performed, it is then determined whether or not the cursor C is placed on a file icon (S12).

If it is determined in step S12 that the cursor C is placed on a file icon, the CPU of the information processing terminal 20A proceeds to step S13, and if it is determined that the cursor C is not placed on a file icon, the CPU proceeds to step S19. The steps including and following step S19 are described below. In step S13, the operation menu M1 for the file corresponding to the selected file icon is displayed. It is then determined whether or not 'Incorporate scanned image' has been selected from the operation menu M1 (S14).

If it is determined in step S14 that a menu item other than 'Incorporate scanned image' has been selected, the processing for that menu item is carried out (S18), whereupon the process ends. On the other hand, if it is determined that 'Incorporate scanned image' has been selected, the file name and the extension are obtained based on the information added to the file icon on which the cursor C is placed (S15). When the file storage position and the identifier to identify the information processing terminal 20A are subsequently obtained (S16), creation of a one-touch key is requested from the MFP 10 based on such parameters as the file name, the extension, the storage position and the information processing terminal 20A identifier (S17), whereupon the processing is ended.

In step S19, the operation menu M2 for the selected directory is displayed. It is then determined whether or not 'Create empty file' has been selected (S20), and if it is determined that a menu item other than 'Create empty file' has been selected, the processing for that menu item is carried out (S25). On the other hand, if it is determined that 'Create empty file' has been selected, the type menu M3 that shows the available file types for the empty file to be created is displayed (S21).

It is then determined whether or not 'Scanned document' has been selected from the type menu M3 (S22), and if it is determined that a menu item other than 'Scanned document' has been selected, the processing for that menu item is carried out (S25). On the other hand, if it is determined that 'Scanned document' has been selected, an empty file is created (S23). It is then determined whether or not a file name and an extension have been input in the box N (see FIG. 11) belonging to the file icon (S24). If it is determined that no file name or extension has been entered, step S24 is repeated again, and if it is determined that a file name and an extension have been entered, the CPU proceeds to step S16, the file storage position and the identifier to identify the information processing terminal 20A are obtained (S16), and creation of a one-touch key based on such parameters as the file name, the extension, the storage position and the information processing terminal 20A identifier is requested from the MFP 10 (S17), whereupon the process ends.

Figure 13:
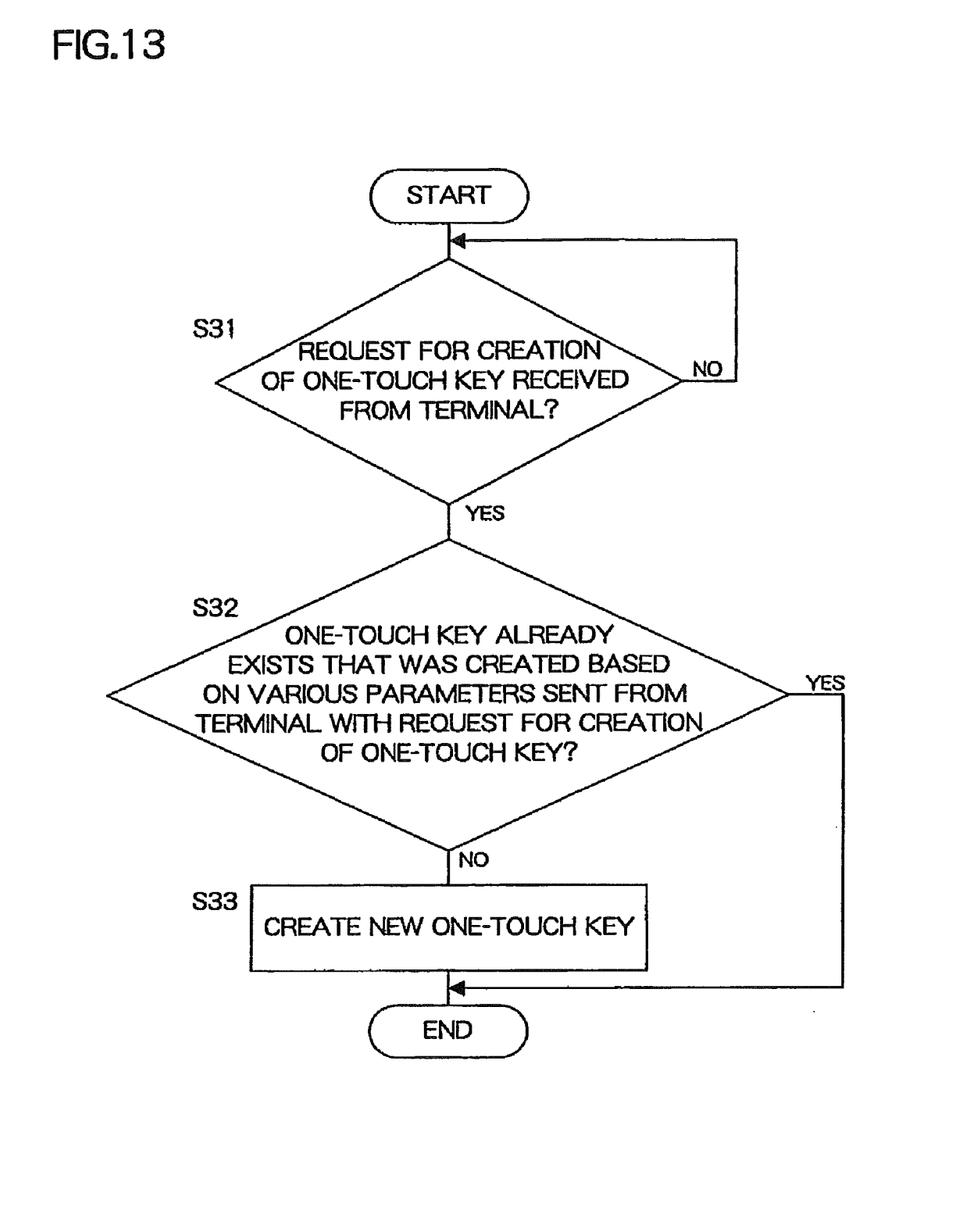
FIG. 13 is a flow chart of the process performed by the MFP that creates a new one-touch key in response to the process performed by the information processing terminal and shown in FIG. 12.

FIG. 13 shows the flow chart of the process executed by the MFP 10 in response to the processing carried out on the side of the information processing terminal 20A shown in FIG. 12. In this process carried out by the MFP 10, it is first determined whether or not a request for the creation of a one-touch key has been received from the information processing terminal 20A or 20B (S31). If it is determined that no such request has been received, step S31 is repeated, and if, on the other hand, it is determined that such a request has been received, it is determined whether or not a one-touch key created based on the parameters sent from the information processing terminal 20A or 20B together with the request for creation of a one-touch key already exists (S32).

If it is determined in step S32 that such one-touch key already exists, the process ends immediately. On the other hand, if it is determined that no such one-touch key exists, a new one-touch key is created (S33), whereupon the process ends.

According to these embodiments, as described above, a desired storage position on a desired information processing terminal can be registered with the MFP 10 as the destination for an image file formed by the MFP 10 through a relatively simple operation on the side of the information processing terminal 20A or 20B, and by entering the storage position registered in this way on the side of the MFP 10 at the time of image file formation, the desired file name and extension can be added to the image file, which is then stored at the desired storage position on the desired information processing terminal.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

In the embodiments described above, an MFP was used as an example of the image forming apparatus, but the present invention is not limited to this implementation. The present invention may be applied using any apparatus that can transmit and receive data to and from an information processing terminal and has a function to read original documents. Such apparatus may be a network scanner or some other device, for example.

In addition, in the embodiment described above, the image file formed by the MFP 10 was stored on the information processing terminal that sends a request for creation of a one-touch key based on an operation by the user, but the present invention is not limited to this implementation. It is also possible to designate through the operation of one information processing terminal a different information processing terminal as the storage destination for the image file. This can be realized by using an information processing terminal to open a shared directory and performing the same operations described in connection with the Embodiments 1 and 2.

Furthermore, in the embodiments described above, right-clicking of the mouse was performed in order to display the operation menus M1 and M2 on the information processing terminal 20A, but the present invention is not limited to this implementation. Where a non-mouse device such as a touch pad, track ball or pointing stick is used, a button that is included therein may be used. In any event, so long as an operation equivalent to right-clicking of a mouse is possible, any means may be used.

What is claimed is:

1. An information processing system comprising an information processing terminal and an image forming apparatus that are connected so as to permit data to be transmitted and received therebetween, said information processing terminal including:
a display controller that causes an icon to be displayed on a display device;
an input unit that accepts operation of said icon by a user at the information processing terminal for the user to assign a file name for an image file to be obtained by the image forming apparatus;
an obtaining unit that obtains, in association with said icon, storage location information by which to identify a storage destination in the information processing terminal for storing said image file to be obtained by said image forming apparatus, and the file name for the image file; and
a transmission unit that transmits to said image forming apparatus information that includes said file name for the image file and said storage location information associated with said icon; and said image forming apparatus including:
a scan unit that scans an image of an original document to obtain an image file;
a display controller that causes a selection key to be displayed on a display device for accepting an instruction about scanning an image of an original document by said scan unit, corresponding to said information transmitted from said information processing terminal; and
a transmission unit that transmits to the information processing terminal the image file obtained by said scan unit corresponding to selection of the selection key,
wherein said information processing terminal stores the image file transmitted from the image forming apparatus in said storage destination identified by said storage location information associated with said icon with said file name.

2. An information processing system according to claim 1, wherein said display controller of the information processing terminal causes a setting screen to be displayed on the display device in response to the operation of the icon, and said obtaining unit obtains the file name based on user's input via the setting screen.

3. An information processing system according to claim 1, wherein said obtaining unit of the information processing terminal further obtains information indicating a file format for the image file to be scanned by said image forming apparatus.

4. A method for obtaining a scanned image file to be performed by an information processing system comprising an information processing terminal and an image forming apparatus that are connected so as to permit data to be transmitted and received therebetween, said method comprising the steps of:

displaying, by said information processing terminal, an icon on a display device;
accepting, by said information processing terminal, operation of said icon by a user at the information processing terminal for the user to assign a file name for an image file to be obtained by the image forming apparatus;
obtaining, by said information processing terminal, storage location information in association with the icon and the file name for the image file, the storage location information identifying a storage destination in the information processing terminal for storing said image file to be obtained by said image forming apparatus; and
transmitting, by said information processing terminal, to said image forming apparatus information that includes said file name for the image file and said storage location information associated with said icon;

displaying, by said image forming apparatus, a selection key on a display device for accepting an instruction about scanning an image of an original document to obtain an image file, corresponding to said information transmitted from said information processing terminal;

transmitting, by said image forming apparatus, to the information processing terminal the image file obtained by scanning corresponding to selection of the selection key; and storing, by said information processing terminal, the image file transmitted from the image forming apparatus in said storage destination identified by said storage location information associated with said icon with said file name.

5. The method according to claim 4, further comprising a step of displaying, by said information processing terminal, a setting screen on the display device in response to the operation of the icon, and wherein said obtaining step obtains the file name based on user's input via the setting screen.

6. The method according to claim 4, wherein said obtaining step further obtains information indicating a file format for the image file to be scanned by said image forming apparatus.

7. An information processing terminal to be connected to an image forming apparatus so as to permit data to be transmitted and received therebetween, comprising:

a display controller that causes an icon to be displayed on a display device;

an input unit that accepts operation of said icon by a user at the information processing terminal for the user to assign a file name for an image file to be obtained by the image forming apparatus;

an obtaining unit that obtains, in association with said icon, storage location information by which to identify a storage destination in the information processing terminal for storing said image file to be obtained by said image forming apparatus and the file name for the image file; and a transmission unit that transmits to said image forming apparatus information that includes said file name for the image file and said storage location information associated with said icon; and a storing unit that stores the image file, which has been obtained by the image forming apparatus and transmitted from the image forming apparatus, in said storage destination identified by said storage location information associated with said icon with said file name.

8. An information processing terminal according to claim 7, wherein said display controller causes a setting screen to be displayed on the display device in response to the operation of the icon, and said obtaining unit obtains the file name based on user's input via the setting screen.

9. An information processing terminal according to claim 7, wherein said obtaining unit further obtains information indicating a file format for an image file to be scanned by said image forming apparatus.

10. A non-transitory computer readable recording medium storing a program for controlling an information processing terminal to be connected to an image forming apparatus so as to permit data to be transmitted and received therebetween, the program comprising computer executable instructions of:

displaying an icon on a display device of the information processing terminal;

accepting operation of said icon by a user at the information processing terminal for the user to assign a file name for an image file to be obtained by the image forming apparatus;

obtaining storage location information in association with the icon and the file name for the image file, the storage location information identifying a storage destination in the information processing terminal for storing said image file to be obtained by said image forming apparatus; and transmitting to said image forming apparatus information that includes said file name for the image file and said storage location information associated with said icon; and storing the image file, which has been obtained by the image forming apparatus and transmitted from the image forming apparatus, in said storage destination identified by said storage location information associated with said icon with said file name.

11. A non-transitory computer readable recording medium according to claim 10, wherein the program further comprises a computer executable instruction of displaying a setting screen on the display device in response to the operation of the icon, and said instruction of obtaining the file name based on user's input via the setting screen.

12. A non-transitory computer readable recording medium according to claim 10, wherein said instruction of obtaining identification information further obtains information indicating a file format for an image file to be scanned by said image forming apparatus.

13. An information processing system according to claim 3, wherein said display controller of the information processing terminal causes a setting screen to be displayed on the display device in response to the operation to the icon, and said obtaining unit obtains the file format based on a user's input via the setting screen.

14. The method according to claim 6, further comprising causing a setting screen to be displayed on the display device of the information processing terminal in response to the operation to the icon, and obtaining the file format based on a user's input via the setting screen.

15. An information processing terminal according to claim 9, wherein said display controller of the information processing terminal causes a setting screen to be displayed on the display device in response to the operation to the icon, and said obtaining unit obtains the file format based on a user's input via the setting screen.

16. A non-transitory computer readable recording medium according to claim 12, the program comprising further computer executable instructions of causing a setting screen to be displayed on the display device of the information processing terminal in response to the operation to the icon, and obtaining the file format based on a user's input via the setting screen.

* * * * *